United States Patent [19]
Nanjo

[11] Patent Number: 5,499,072
[45] Date of Patent: Mar. 12, 1996

[54] VARIABLE MAGNIFICATION FINDER

[75] Inventor: Yusuke Nanjo, Kanagawa, Japan

[73] Assignee: Sony Corporation, Tokyo, Japan

[21] Appl. No.: 265,589

[22] Filed: Jun. 24, 1994

[30] Foreign Application Priority Data

Jul. 6, 1993 [JP] Japan .................................. 5-165829

[51] Int. Cl.$^6$ ............................ G03B 13/10; G02B 15/00
[52] U.S. Cl. .............................................. 354/222; 359/676
[58] Field of Search ............................ 354/222; 359/676, 359/679

[56] References Cited

U.S. PATENT DOCUMENTS 5,247,324  9/1993  Estelle ..................................... 354/222

FOREIGN PATENT DOCUMENTS 2-253241  10/1990  Japan ..................................... 354/222
5-66347   3/1993   Japan .

OTHER PUBLICATIONS

Camara•Lens Encyclopedia published by Shashinkogyo–Shuppansha pp. 28–30.
Camera Industry vol. 48, No. 7, 1990, pp. 77–79.

Primary Examiner—Michael L. Gellner
Assistant Examiner—Mike Dalakis
Attorney, Agent, or Firm—Pasquale Musacchio; Charles M. Fish; Jerry A. Miller

[57] ABSTRACT

A variable magnification finder wherein a change in magnification is performed by rotating the finder about an axis. According to a first embodiment of this invention, a variable magnification finder has in succession from an object side a first lens component including a four-surface lens, a second lens component having a convex surface facing the object side and a third lens component having a convex surface facing the object side. The four-surface lens includes a first surface opposite a second surface and a third surface opposite a fourth surface. The first and second surfaces have a first optical axis in common and the third and fourth surfaces have a second optical axis in common. The first optical axis is substantially perpendicular to the second optical axis. Magnification of the finder is changed by rotating the four-surface lens on a third optical axis which is substantially perpendicular the first and second optical axes.

20 Claims, 3 Drawing Sheets

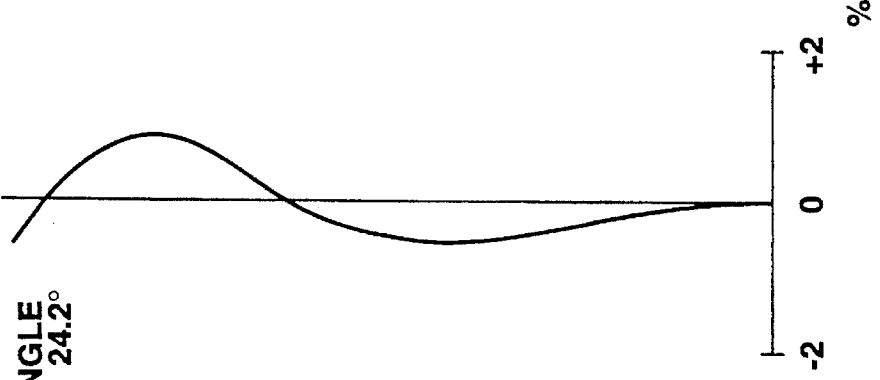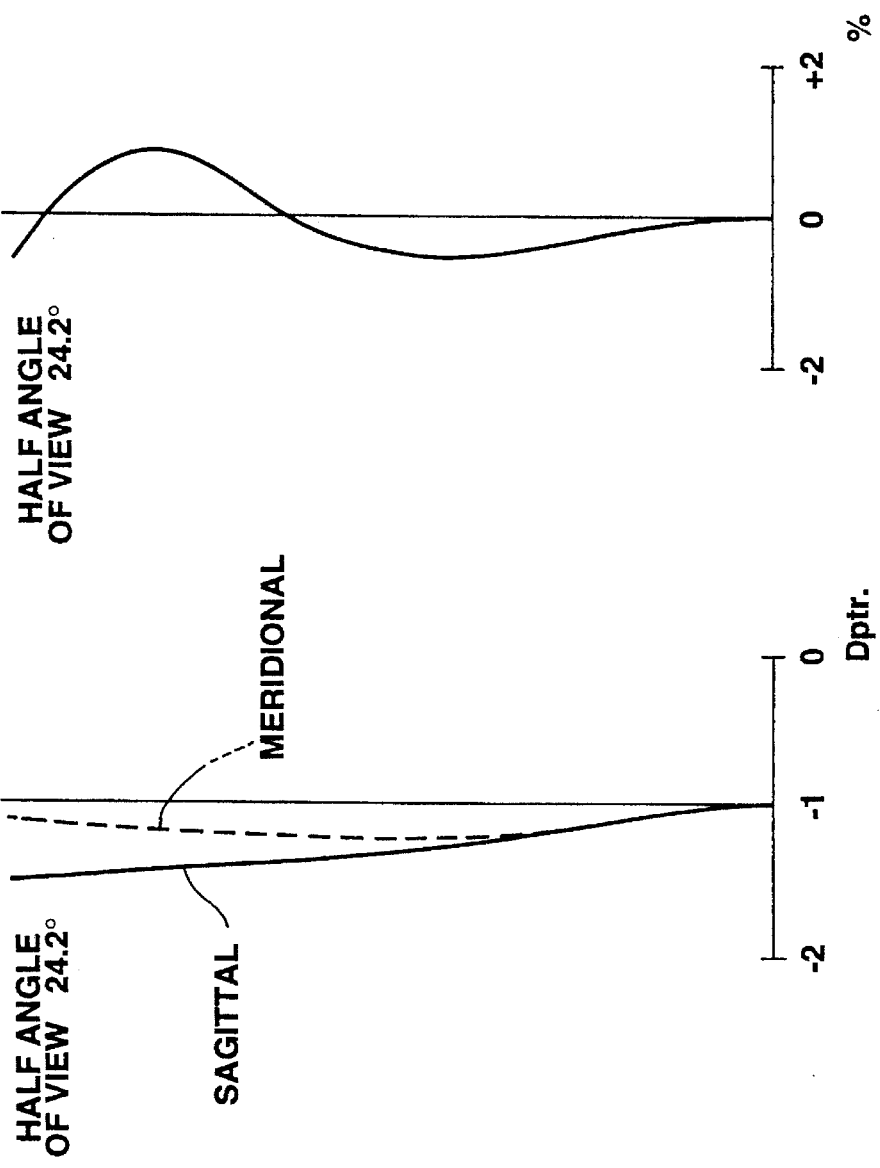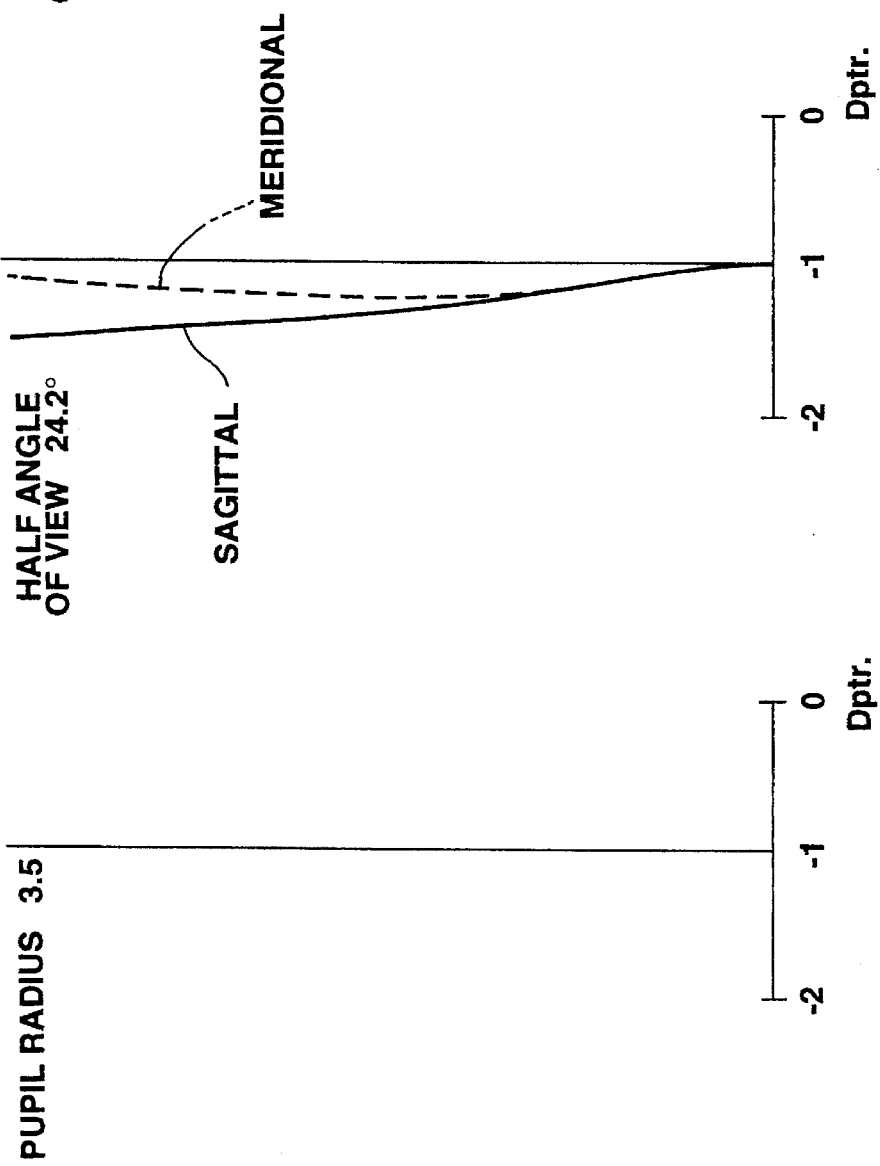

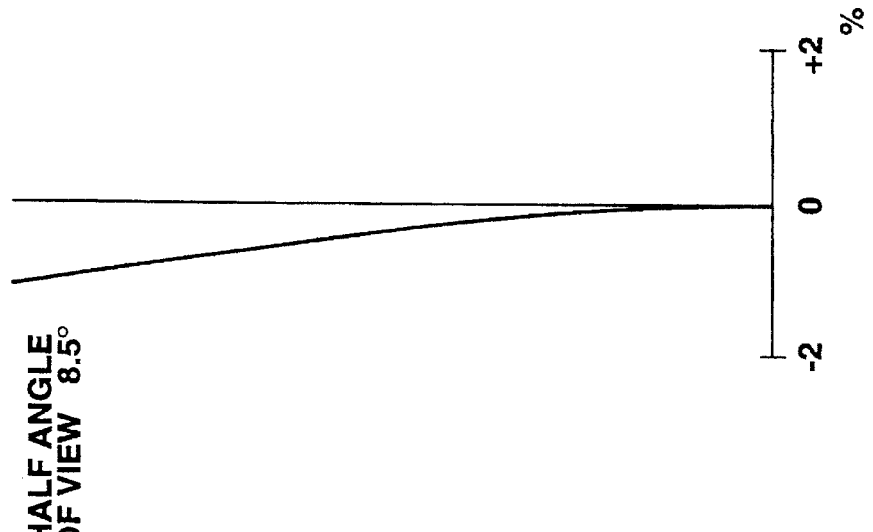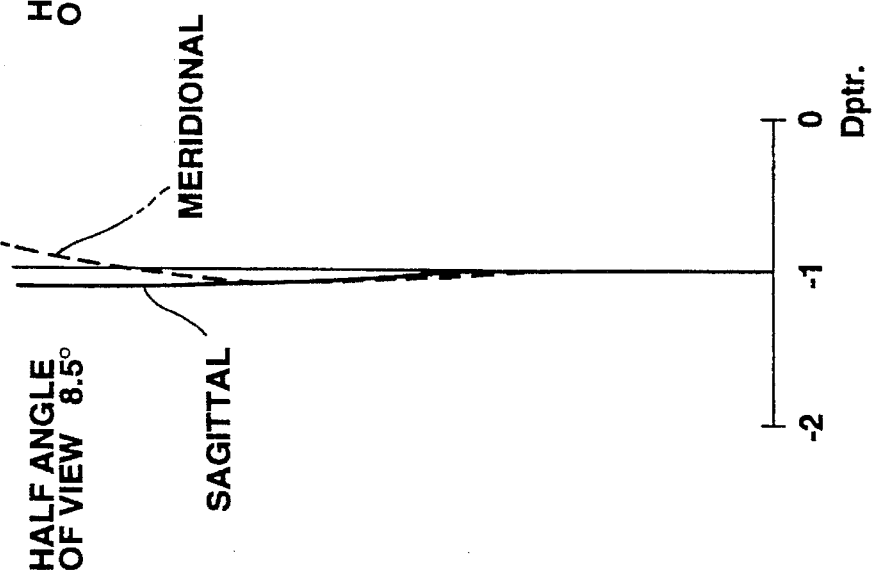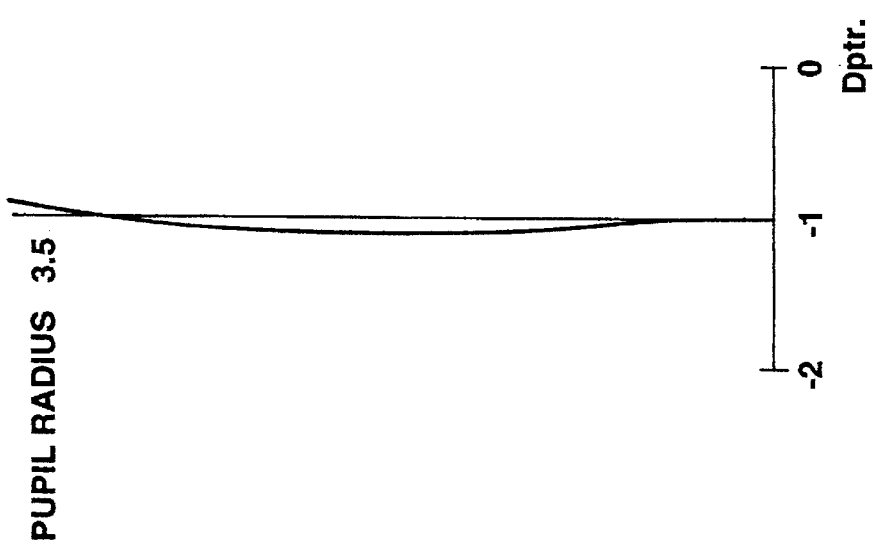

VARIABLE MAGNIFICATION FINDER

FIELD OF THE INVENTION

This invention relates to a variable magnification finder utilized for a video camera or a still camera. More particularly, this invention relates to a variable magnification finder utilized for a video camera or a still camera wherein an angle of view of a lens is changed between a wide-angle side and a telephoto side and a lens has a variable magnification ratio of two or three times.

BACKGROUND OF THE INVENTION

Lenses in many prior art variable magnification finders move in the direction of an optical axis during a magnification change. This is a disadvantage since the structure of lense components for enabling such movement is complex and expensive.

Further, in prior art zoom finders, light goes through the same lens in a low magnification position as in a high magnification position. As such, an aberration change occurs during a magnification change. Therefore, it is difficult to compensate for aberrations.

SUMMARY OF THE INVENTION

One object of this invention is to provide a variable magnification finder having a simple mechanism.

According to a first embodiment of this invention, a variable magnification finder has in succession from an object side a first lens component including a four-surface lens, a second lens component having a convex surface facing the object side and a third lens component having a convex surface facing the object side. The four-surface lens includes a first surface opposite a second surface and a third surface opposite a fourth surface. The first and second surfaces have a first optical axis in common and the third and fourth surfaces have a second optical axis in common. The first optical axis is substantially perpendicular to the second optical axis. Magnification of the finder is changed by rotating the four-surface lens on a third optical axis which is substantially perpendicular the first and second optical axes.

BRIEF DESCRIPTION OF THE DRAWINGS

FIG. 3(a) depicts spherical aberration in the low magnification position of the variable magnification finder of FIG. 1.

FIG. 3(b) depicts astigmatism in a low magnification position of the variable magnification finder of FIG. 1.

FIG. 3(c) depicts distortion aberration in a low magnification position of the variable magnification finder of FIG. 1.

FIG. 4(a) depicts spherical aberration in the high magnification position of the variable magnification finder of FIG. 1.

FIG. 4(b) depicts astigmatism in the high magnification position of the variable magnification finder of FIG. 1.

FIG. 4(c) depicts distortion aberration in the high magnification position of the variable magnification finder of FIG. 1.

DETAILED DESCRIPTION OF THE INVENTION

Figure 1:
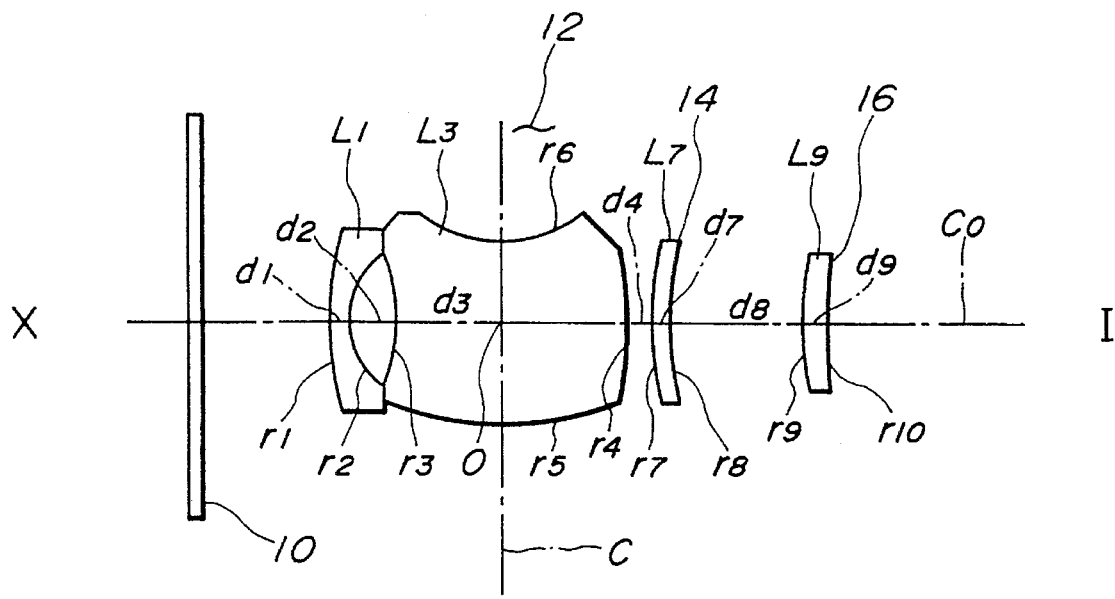
FIG. 1 is a view explaining an example of a variable magnification finder of this invention wherein the finder is set in a low magnification position.

In accordance with the present invention, the design of a variable magnification finder includes the following steps:

(1) Basic design parameters are specified.

The design parameters include field angle of lens in a wide angle position and a telephoto position, magnification of finder in a low magnification position and a high magnification position, total length of finder, eyepoint position, standard visibility through finder and space restrictions due to design.

(2) A concave mirror and an ocular lens are designed.

First, an optical system forming an optical frame is determined. A distance between a concave mirror and an ocular lens is regarded as a parameter. The curvature of the concave mirror and the refractive power of the ocular lens are determined so as to achieve the standard visibility. The optical system is configured so that reflected light of a reticle lighted from the front reaches an eye point and aberration of the optical frame is suitable.

(3) A refractive power of surface of objective lens in a high magnification position is determined.

A first thickness of a four-surface lens is determined. Then, refractive powers of a convex surface and a concave surface of the four-surface lens are determined so that the magnification of finder and visibility of a point at infinity correspond with the design parameters.

(4) A refractive power of surface of objective lens in a low magnification side is determined.

A second thickness of the four-surface lens is determined. Then, refractive powers of a convex surface and a concave surface of the four-surface lens are determined so that the magnification of finder and visibility of a point at infinity correspond with the design parameters. In addition, an objective lens may be added in order to provide a suitable magnification ratio.

(5) Aberration compensation is performed with an objective lens.

Aberration in a spherical lense is dependent on factors such as thickness and radius of curvature of the lense. In order to reduce aberration, high precision manufacturing techniques are utilized. In addition, such lenses are fabricated from glass. As such, spherical lenses are expensive to fabricate. In addition, it is difficult to compensate for aberrations that exist after fabrication of a spherical lense. In accordance with the present invention, each surface of a four-surface lens and of an objective lens are fabricated from plastic such that the surfaces are aspherical. An aspherical coefficient is then utilized to compensate for aberrations.

(6) Evaluate characteristics of the four-surface lens.

A determination is made as to whether the effective diameter, shape, volume and other characteristics of the four surface lens are suitable. If an effective diameter of an adjacent surface is not suitable, return to step (3) or step (4).

(7) Determine whether the variable magnification finder satisfies the design parameters of step (1).

If the design parameters are not met, steps (1)–(6) are repeated. In addition, a new four-surface lens may be selected.

A variable magnification finder is designed by the above described design steps. As will be described, the variable magnification finder includes a maximum of four optical parts and enables a change of magnification of up to 3×. In addition, the magnification is changed by rotating an objective lens approximately 90 degrees.

An example of the invention is explained as follows.

In FIG. 1, the finder is depicted in a low magnification configuration. In this position, the first concave surface $r_3$ of the four-surface lens $L_3$ faces the object side X and the first convex surface $r_4$ faces the image side I.

Examples of numerical values in the low magnification position of the invention are shown as follows.

| | Radius of Curvature (mm) | | Distance (mm) | | Refractive Index (m) | | ABBE No. |
|---|---|---|---|---|---|---|---|
| $r_1$ | 60.63 | $d_1$ | 1.5 | $n_1$ | 1.492 | $v_1$ | 57.2 |
| $r_2$ | 6.63 | $d_1$ | 3.8 | | | | |
| $r_3$ | −21.65 | $d_3$ | 17. | $n_2$ | 1.492 | $v_2$ | 57.2 |
| $r_4$ | −20.06 | $d_4$ | 2. | | | | |
| $r_7$ | 33.54 | $d_7$ | 1.2 | $n_3$ | 1.492 | $v_3$ | 57.2 |
| $r_8$ | 25.31 | $d_1$ | 10. | | | | |
| $r_9$ | 25. | $d_9$ | 2. | $n_4$ | 1.492 | $v_4$ | 57.2 |
| $r_{10}$ | 143.86 | | | | | | |

| Aspherical Coefficient | $A_4$ | $A_6$ | $A_8$ | $A_{10}$ |
|---|---|---|---|---|
| $r_1$ | $-0.296 \times 10^{-4}$ | $0.691 \times 10^{-5}$ | 0. | 0. |
| $r_2$ | $-0.156 \times 10^{-2}$ | $0.269 \times 10^{-4}$ | 0. | 0. |
| $r_3$ | $-0.162 \times 10^{-2}$ | $0.614 \times 10^{-4}$ | $-0.153 \times 10^{-5}$ | $0.124 \times 10^{-7}$ |
| $r_4$ | $-0.859 \times 10^{-4}$ | $0.289 \times 10^{-5}$ | $-0.908 \times 10^{-7}$ | $0.957 \times 10^{-9}$ |

Referring from left to right of FIG. 1, a protection element 10, a first lens component 12, a second lens component 14 and a third lens component 16 are shown. The protection element 10 is positioned to the right of an object side X and serves to protect the lenses 12,14,16. Referring to FIG. 1, the first lens component includes a four-surface lens $L_3$ fabricated from plastic having a first concave surface $r_3$ which faces leftward toward the object side X and first convex surface $r_4$ which faces rightward toward an image side I. In addition, the four surface lens $L_3$ includes a second concave surface $r_6$ which faces upward and a second convex surface $r_5$ which faces downward.

The first lens component 14 may also include a negative meniscus lens $L_1$ positioned between the first concave surface $r_3$ and the protection element 10. The negative meniscus lens $L_1$ is fabricated from plastic and includes a third convex surface $r_1$ which faces the object side X and a third concave surface $r_2$ which faces the first concave surface $r_3$. The negative meniscus lens $L_1$ may be combined with the four-surface lens $L_3$ as shown in FIG. 1. Alternatively, the negative meniscus lens $L_1$ may be separated (not shown) from the four-surface lens $L_3$. Surfaces $r_1$ and $r_2$ of the negative meniscus lens $L_1$ and surfaces $r_3$ and $r_4$ of the four-surface lens $L_3$ hold an optical axis $C_0$ in common. Surfaces $r_5$ and $r_6$ of the four-surface lens $L_3$ hold an optical axis C in common. The optical axis $C_0$ intersects the optical axis C at a point S and is substantially perpendicular to the optical axis C. In addition, an axis O intersects point S. Axis O is substantially perpendicular to the optical axis $C_0$ and the optical axis C.

The second lens component 14 includes a mirror $L_7$ having a fourth convex surface $r_7$ and a fourth concave surface $r_8$. The fourth convex surface $r_7$ faces the first convex surface $r_4$. The mirror $L_7$ may be a semi-transparent mirror or alternatively a mirror which is all-reflective on a selected peripheral part thereof.

The third lens component includes a positive lens $L_9$ having a fifth convex surface $r_9$ which faces the fourth concave surface $r_8$. A reticle (not shown) is provided on the positive lens $L_9$.

Figure 2:
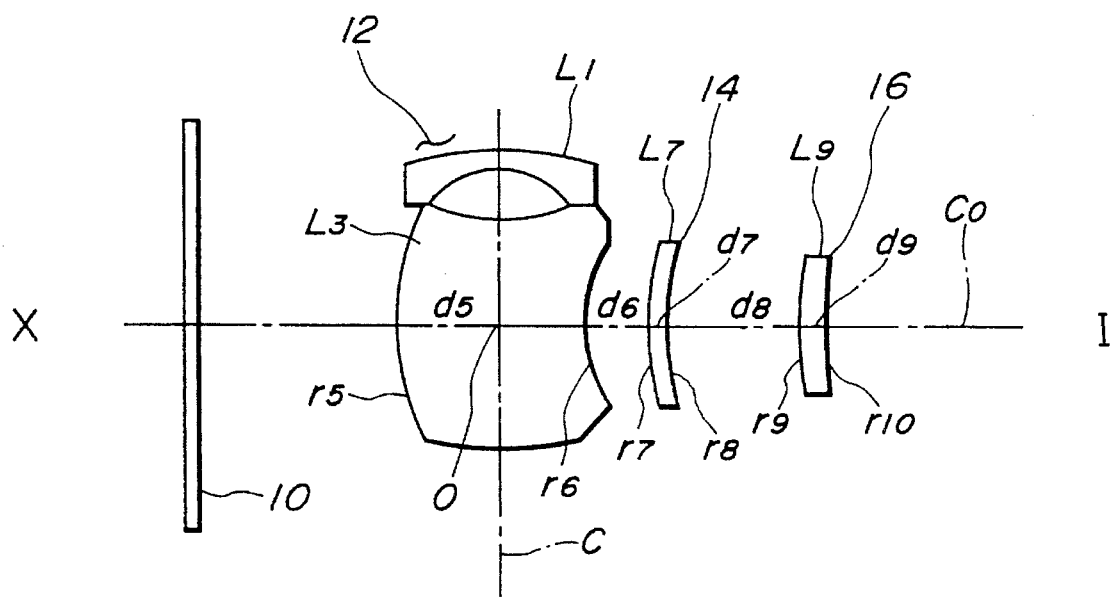
FIG. 2 is a view explaining the variable magnification finder of FIG. 1 wherein the finder is set in a high magnification position.

FIG. 2 shows the finder in a high magnification position. Magnification is changed by rotating the four-surface lens $L_3$ from the low magnification position approximately 90 degrees about the O axis into the high magnification position. In this position, the second convex surface $r_5$ of the four-surface lens $L_3$ faces the object side X and the second concave surface $r_6$ of the four-surface lens $L_3$ faces the image side I. In addition, the negative meniscus lens $L_1$ may be out of the optical path of the finder.

Examples of numerical values in the high magnification position of the invention are shown as follows.

| | Radius of Curvature (mm) | | Distance (mm) | | Refractive Index (m) | | ABBE No. |
|---|---|---|---|---|---|---|---|
| $r_5$ | 18.46 | $d_5$ | 14. | $n_2$ | 1.492 | $v_2$ | 57.2 |
| $r_6$ | 9.25 | $d_6$ | 5.2 | | | | |
| $r_7$ | 33.54 | $d_7$ | 1.2 | $n_3$ | 1.492 | $v_3$ | 57.2 |
| $r_8$ | 25.31 | $d_8$ | 10. | | | | |
| $r_9$ | 25. | $d_9$ | 2. | $n_4$ | 1.492 | $v_4$ | 57.2 |
| $r_{10}$ | 143.86 | | | | | | |

| Aspherical Coefficient | $A_4$ | $A_6$ |
|---|---|---|
| $r_5$ | $-0.174 \times 10^{-4}$ | $-0.775 \times 10^{-7}$ |
| $r_6$ | $-0.123 \times 10^{-3}$ | $-0.202 \times 10^{-5}$ |

Definition of aspherical surface:

$$\chi_i = H^2/r_i \{1+(1-H^2/r_i^2)^{1/2}\} + \Sigma A_i \times H^i$$

$X_i$: Depth of aspherical surface

H: Height from an optical axis

Magnification of finder: low magnification position: 0.333 times high magnification position: 1.0 times Visibility: Each image and reticle in low magnification position, high magnification side of point at infinity: −1 Diopter Apparent field of vision of reticle: Vertical 10.3°, Horizontal 13.7°, Opposite angle 17.1°

Eye point: 20 mm behind the surface of $r_{10}$

FIGS. 3(a), 3(b) and 3(c) show spherical aberration, astigmatism and a distortion aberration, respectively, of the image and the optical frame for a point at infinity when utilizing the above stated examples of numerical values for the low magnification position.

FIG. 4(a), 4(b) and 4(c) show spherical aberration, astigmatism and a distortion aberration, respectively, of the image and the optical frame for a point at infinity when utilizing the above stated examples of numerical values for the high magnification position.

In accordance with the invention, it is not necessary to move lenses in the direction of the optical axis in order to change magnification. Therefore, the structure for changing magnification may be simplified and decreased in size, resulting in a reduction in manufacturing costs. Furthermore, the use of plastic for fabricating the four surface lens $L_3$ and the negative meniscus lens $L_1$ further reduces manufacturing costs relative to using glass since plastic is relatively easier to manufacture.

In accordance with the present invention, a magnification change is performed by rotating the four-surface lens $L_3$ approximately 90 degrees. In the low magnification position, the first concave surface $r_3$, first convex surface $r_4$, mirror $L_7$ and positive lens $L_9$ are located in succession from the object side X to the image side I. In the high magnification position, the second convex surface $r_5$ and the second concave surface $r_6$ are located in succession from the object side X to the image side I. Therefore, aberration compensation in either the low magnification position or in the high magnification position may be performed independently of each other, thus decreasing complexity and reducing manufacturing costs.

While this invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the appended claims.

What is claimed is:

1. A variable magnification finder having an object side and an image side comprising:

in succession from said object side, a first lens component, said first lens component including a four-surface lens having a first surface opposite a second surface and a third surface opposite a fourth surface, said first and second surfaces having a first optical axis in common, said third and fourth surfaces having a second optical axis in common, said first optical axis being substantially perpendicular to said second optical axis;

a second lens component having a convex surface facing said object side; and a third lens component having a convex surface facing the object side;

wherein magnification of said finder is changed by rotating said four-surface lens about a third optical axis which is substantially perpendicular to said first and second optical axes.

2. A variable magnification finder according to claim 1, wherein said first surface is concave and faces said object side and said second surface is convex and faces said image side.

3. A variable magnification finder according to claim 1, wherein said third surface is convex and said fourth surface is concave.

4. A variable magnification finder according to claim 1, wherein magnification of said finder is changed by rotating said four-surface lens approximately 90 degrees about said third optical axis.

5. A variable magnification finder according to claim 1, wherein said third lens component has a fourth optical axis and said first optical axis corresponds with said fourth optical axis when said finder is in a low magnification position.

6. A variable magnification finder according to claim 1, wherein said third lens component has a fourth optical axis and said second optical axis corresponds with said fourth optical axis when said finder is set in a high magnification position.

7. A variable magnification finder according to claim 1, further comprising a negative meniscus lens having a convex surface facing said object side and a concave surface.

8. A variable magnification finder according to claim 7, wherein said negative meniscus lens is combined with said four-surface lens.

9. A variable magnification finder according to claim 7, wherein said negative meniscus lens is located between said object side and said four-surface lens in a low magnification position.

10. A variable magnification finder according to claim 7, wherein said negative meniscus lens is moved out of an optical path of said finder in a high magnification position.

11. A variable magnification finder according to claim 7, wherein said convex and concave surfaces are each aspherical.

12. A variable magnification finder according to claim 7, said negative meniscus lens is made of plastic.

13. A variable magnification finder according to claim 1, wherein said second lens component is a mirror which is semitransparent.

14. A variable magnification finder according to claim 1, wherein said second lens component is a mirror which is all-reflective on a peripheral part thereof.

15. A variable magnification finder according to claim 1, wherein said third lens component includes a reticle.

16. A variable magnification finder according to claim 15, wherein a size of a virtual image in said reticle remains constant after a magnification change.

17. A variable magnification finder according to claim 1, wherein said first surface is concave and faces said object side and said second surface is convex and faces said image side in a low magnification position.

18. A variable magnification finder according to claim 1, wherein said third surface is convex and faces said object side and said fourth surface is concave and faces said image side in a high magnification position.

19. A variable magnification finder according to claim 1, wherein said first, second, third and fourth surfaces are each aspherical.

20. A variable magnification finder according to claim 1, said four-surface lens component is made of plastic.

* * * * *